United States Patent
Zhang et al.

(10) Patent No.: US 11,468,594 B2
(45) Date of Patent: Oct. 11, 2022

(54) IMAGE PROCESSING METHOD, DEVICE AND APPARATUS FOR MULTI-OBJECT DETECTION

(71) Applicant: BOE TECHNOLOGY GROUP CO., LTD., Beijing (CN)

(72) Inventors: Huanhuan Zhang, Beijing (CN); Tong Liu, Beijing (CN); Yifei Zhang, Beijing (CN); Xiaojun Tang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 11 days.

(21) Appl. No.: 16/904,800

(22) Filed: Jun. 18, 2020

(65) Prior Publication Data
US 2020/0320736 A1  Oct. 8, 2020

Related U.S. Application Data

(63) Continuation-in-part of application No. PCT/CN2019/100039, filed on Aug. 9, 2019.

(30) Foreign Application Priority Data

Aug. 9, 2018 (CN) .......................... 201810903584.1

(51) Int. Cl.
*G06K 9/00* (2022.01)
*G06T 7/73* (2017.01)
(Continued)

(52) U.S. Cl.
CPC .................. *G06T 7/73* (2017.01); *G06T 7/33* (2017.01); *G06T 7/97* (2017.01)

(58) Field of Classification Search
CPC .... G06T 7/33; G06T 7/73; G06T 7/97; G06K 9/00624; G06K 9/4604; G06K 9/6202; G06K 9/6277
See application file for complete search history.

(56) References Cited

U.S. PATENT DOCUMENTS 9,165,369 B1  10/2015 Zhang et al.
9,514,366 B2 * 12/2016 Schweid ............ G06K 9/00624
(Continued)

FOREIGN PATENT DOCUMENTS

CN  106056101 A  10/2016
CN  106228158 A  12/2016
(Continued)

OTHER PUBLICATIONS

R.Rothe,M.Guillaumin,and L.Van Gool. Non-maximum suppression for object detection by passing messages between windows. In Asian Conference on Computer Vision. 2014 (Year: 2014).*
Desai, C., Ramanan, D., Fowlkes, C.C. Discriminative models for multi-class object layout. IJCV 95 (1) 2011 (Year: 2011).*
(Continued)

*Primary Examiner* — Ian L Lemieux
(74) *Attorney, Agent, or Firm* — Nath, Goldberg & Meyer; Joshua B. Goldberg

(57) ABSTRACT

The present disclosure provides an image processing method, device and apparatus, and a computer-readable storage medium. The image processing method includes: obtaining an image and detecting multiple targets in the image; obtaining categories of multiple detected targets and first parameters of a detection frame corresponding to each detected target, and ranking all detected targets according to the first parameters in a descending order to obtain a dataset; obtaining a target with a highest first parameter in the dataset as a first detected target, and detecting whether the first parameter of a first detection frame corresponding to the first detected target satisfies a preset category condition of a category to which the first detected target belongs; detecting whether the first detection frame corresponding to the first detected target overlaps with a detection frame corresponding to a respective one of the plurality of detected targets except the first detected target.

14 Claims, 4 Drawing Sheets

(51) Int. Cl.
*G06T 7/00* (2017.01)
*G06T 7/33* (2017.01)

(56) References Cited

U.S. PATENT DOCUMENTS

| | | | | |
|---|---|---|---|---|
| 10,157,331 | B1* | 12/2018 | Tang | G06K 9/6231 |
| 2016/0203525 | A1* | 7/2016 | Hara | G06K 9/6277 |
| | | | | 705/14.56 |
| 2017/0287185 | A1* | 10/2017 | Kumar | H04N 5/23222 |
| 2019/0258878 | A1* | 8/2019 | Koivisto | G05D 1/00 |
| 2020/0394458 | A1* | 12/2020 | Yu | G06K 9/623 |
| 2021/0042588 | A1* | 2/2021 | Shaw | G06K 9/6218 |

FOREIGN PATENT DOCUMENTS

| | | | | |
|---|---|---|---|---|
| CN | 106778835 | A | | 5/2017 |
| CN | 107301431 | A | | 10/2017 |
| CN | 107679469 | A | | 2/2018 |
| CN | 111401148 | A | * | 7/2020 |
| KR | 1020170138842 | A | | 12/2017 |
| WO | WO-2018197019 | A1 | * | 11/2018 ........... G06K 9/6256 |

OTHER PUBLICATIONS

C. Galleguillos, A. Rabinovich, and S. Belongie. Object categorization using co-occurrence, location and appearance. In CVPR, Anchorage, AK, 2008 (Year: 2008).*
Gong, Meiling, Wang, Dong, Zhao, Xiaoxia, Guo, Huimin, Luo, Donghao, et al. A review of non-maximum suppression algorithms for deep learning target detection. Proceedings vol. 11763, Seventh Symposium on Novel Photoelectronic Detection Technology and Applications; 1176332 (2021) (Year: 2021).*
International Search Report dated Oct. 28, 2019 corresponding to application No. PCT/CN2019/100039.
ESSR dated Mar. 31, 2022 issued in corresponding European Application No. 19846730.0 Retrieved https://register.epo.org/application?tab=doelist&number=EP19846730&lng=en.
Roth Rasmus et al., "Non-maximum Suppression for Object Detection by Passing Messages Between Windows: 12th Asian Conference on Computer Vision, Singapore Singapore, Nov. 2014, Revised Selected Papers, Part I", vol. 9003, pp. 290-306.
Jan Hosang et al., "Learning non-maximum suppression", 2017 IEEE Conference on Computer Vision and Pattern Recognition (CVPR), May 2017, pp. 1-16.

* cited by examiner

IMAGE PROCESSING METHOD, DEVICE AND APPARATUS FOR MULTI-OBJECT DETECTION

TECHNICAL FIELD

The present disclosure relates to the computer technology, more particularly, to an image processing method, device and apparatus for detection of multiple targets, and a computer-readable storage medium.

BACKGROUND

In the process of image processing, non-maximum suppression is an important part of computer vision. In computer vision tasks, non-maximum suppression is often used to extract valid feature points on an image, and then perform a local search to extract the feature points with the highest local score.

For densely distributed multi-object detection, a heuristic window fusion algorithm is likely to cause a large number of missed detections; mean shift non-maximum suppression is complicated to calculate, which is not conducive to implement a real-time detection. Currently, non-maximum of greedy strategies has a better effect on the improvement of the detection accuracy for a single category of targets such as human faces and pedestrians, but there are limitations to the improvement of the detection accuracy for multiple categories of densely distributed targets.

SUMMARY

In one aspect, the present disclosure provides an image processing method for multi-object detection, including: obtaining an image including a plurality of targets and detecting the plurality of targets included in the image; obtaining categories of the plurality of detected targets and first parameters of respective detection frames corresponding to the respective plurality of detected targets respectively, and ranking the plurality of detected targets according to the first parameters in a descending order to obtain a dataset; obtaining a target with a highest first parameter in the dataset as a first detected target, and detecting whether a first parameter of a first detection frame corresponding to the first detected target satisfies a preset category condition of a category to which the first detected target belongs; when the first parameter of the first detection frame corresponding to the first detected target satisfies the preset category condition of the category to which the first detected target belongs, detecting whether the first detection frame corresponding to the first detected target overlaps with a detection frame corresponding to another target among the plurality of detected targets except the first detected target; when the first detection frame overlaps with the detection frame corresponding to the other target, recording the other target as a second detected target, comparing whether the category of the first detected target is a same as that of the second detected target, and selecting a corresponding method according to a result of comparing the category of the first detected target with that of the second detected target, to determine whether to remove the second detected target from the dataset; and when the second detected target is determined to be removed from the dataset, removing the second detected target from the dataset to obtain a current dataset, and performing a step of obtaining the target with the highest first parameter in the dataset as the first detected target wherein the current dataset is used as the dataset, to traverse all detected targets in the dataset; when the second detected target is determined not to be removed from the dataset, obtaining a current dataset with not removing the first detected target and the second detected target from the dataset, and performing the step of obtaining the target with the highest first parameter in the dataset as the first detected target wherein a dataset composed of all detected targets in the current dataset except the second detected target is used as the dataset, to traverse all detected targets in the dataset.

According to all embodiment of the present disclosure, the step of detecting whether the first parameter of the first detection frame corresponding to the first detected target satisfies the preset category condition of the category to which the first detected target belongs includes: detecting whether the first parameter of the first detection frame corresponding to the first detected target is greater than a larger one of first and second thresholds, wherein $THR_2 = ave_1 - \gamma \times std_1$, $THR_2$ represents the second threshold, $\gamma$ is a value selected from a range from 1 to 3, $ave_1$ represents an average value of first parameters of respective detection frames corresponding respectively to respective detected targets in the category to which the first detected target belongs, and $std_1$ represents a variance of the first parameters of the respective detection frames corresponding respectively to the respective detected targets in the category to which the first detected target belongs; when the first parameter of the first detection frame corresponding to the first detected target is greater than the larger one of the first and second thresholds, detecting whether the first detected target is a detected target in the category to which the first detected target belongs to be firstly processed in the dataset; and when the first detected target is not the detected target in the category to which the first detected target belongs to be firstly processed in the dataset, detecting whether a difference between the first parameter of the first detection frame corresponding to the first detected target and a first parameter of a detection frame corresponding to a previous processed detected target in the category to which the first detected target belongs is less than a third threshold, and when the difference is less than the third threshold, performing a step of detecting whether the first detection frame corresponding to the first detected target overlaps with a detection frame corresponding to another target among of the plurality of detected targets except the first detected target.

According to an embodiment of the present disclosure, the step of when the first detection frame overlaps with the detection frame corresponding to the other target, recording the other target as the second detected target, comparing whether the category of the first detected target is the same as that of the second detected target, and selecting the corresponding method according to the result of comparing the category of the first detected target with that of the second detected target, to determine whether to remove the second detected target from the dataset includes: comparing whether the category of the first detected target is the same as that of the second detected target; when the category of the first detected target is the same as that of the second detected target, determining whether to remove the second detected target from the dataset, according to a comparison result of the first parameter of the first detection frame corresponding to the first detected target to a first preset category threshold of the category to which the first and second detected targets belong, a comparison result of the first parameter of a second detection frame corresponding to the second detected target to the first preset category threshold, a ratios of an overlapping area between the first detection frame and a second detection frame corresponding to the second detected target, to an area of the first detection frame and an area of the second detection frame respectively; wherein the respective ratios of the overlapping area between the first and second detection frames to the respective areas of the first and second detection frames are recorded as a first ratio and a second ratio respectively.

According to an embodiment of the present disclosure, the step of when the first detection frame overlaps with the detection frame corresponding to the other target, recording the other target as the second detected target, comparing whether the category of the first detected target is the same as that of the second detected target, and selecting the corresponding method according to the result of comparing the category of the first detected target with that of the second detected target, to determine whether to remove the second detected target from the dataset includes: comparing whether the category of the first detected target is the same as that of the second detected target; when the category of the first detected target is different from that of the second detected target, determining whether to remove the second detected target from the dataset according to a comparison result of the first parameter of the first detection frame corresponding to the first detected target to a first preset category threshold of the category to which the first detected target belongs, a comparison result of the first parameter of a second detection frame corresponding to the second detected target to a first preset category threshold of the category to which the second detected target belongs, a ratio of an overlapping area between the first detection frame and a second detection frame corresponding to the second detected target, to an area of the first detection frame, a ratio of the overlapping area between the first and second detection frames to an area of the second detection frame, and a comparison result of the first parameter of the second detection frame corresponding to the second detected target to a second preset category threshold, wherein the respective ratios of the overlapping area between the first and second detection frames to the respective areas of the first and second detection frames are recorded as a first ratio and a second ratio respectively.

According to an embodiment of the present disclosure, the step of when the category of the first detected target is the same as that of the second detected target, determining whether to remove the second detected target from the dataset, according to a comparison result of the first parameter of the first detection frame corresponding to the first detected target to a first preset category threshold of the category to which the first and second detected targets belong, a comparison result of the first parameter of a second detection frame corresponding to the second detected target to the first preset category threshold, a ratios of an overlapping area between the first detection frame and a second detection frame corresponding to the second detected target, to an area of the first detection frame and an area of the second detection frame respectively includes: detecting whether the first parameters of the respective detection frames corresponding respectively to the first and second detected targets are both greater than the first preset category threshold of the category to which the first and second detected targets belong, wherein $THR_4=ave_1+2\times std_1$, $THR_4$ represents the first preset category threshold of the category to which the first and second detected targets belong, $ave_1$ represents the average value of the first parameters of the respective detection frames corresponding respectively to the respective detected targets in the category to which the first detected target belongs, and $std_1$ represents the variance of the first parameters of the respective detection frames corresponding respectively to the respective detected targets in the category to which the first detected target belongs; when the first parameters of the respective detection frames corresponding respectively to the first and second detected targets are both greater than the first preset category threshold, not removing the second detected target from the dataset; and when the first parameter of the second detection frame corresponding to the second detected target is less than the first preset category threshold, calculating the first ratio and the second ratio, and detecting whether a greater ratio of the first ratio and the second ratio is greater than a first preset ratio, and removing the second detected target from the dataset in a case that the greater ratio of the first ratio and the second ratio is greater than the first preset ratio; otherwise, not removing the second detected target from the dataset.

According to an embodiment of the present disclosure, the step of when the category of the first detected target is different from that of the second detected target, determining whether to remove the second detected target from the dataset according to a comparison result of the first parameter of the first detection frame corresponding to the first detected target to a first preset category threshold of the category to which the first detected target belongs, a comparison result of the first parameter of a second detection frame corresponding to the second detected target to a first preset category threshold of the category to which the second detected target belongs, a ratio of an overlapping area between the first detection frame and a second detection frame corresponding to the second detected target, to an area of the first detection frame, a ratio of the overlapping area between the first and second detection frames to an area of the second detection frame, and a comparison result of the first parameter of the second detection frame corresponding to the second detected target to a second preset category threshold includes: detecting whether the first parameter of the first detection frame corresponding to the first detected target is greater than the first preset category threshold of the category to which the first detected target belongs and the first parameter of the second detection frame corresponding to the second detected target is greater than the first preset category threshold of the category to which the second detected target belongs; when the first parameter of the first detection frame corresponding to the first detected target is greater than the first preset category threshold of the category to which the first detected target belongs and the first parameter of the second detection frame corresponding to the second detected target is greater than the first preset category threshold of the category to which the second detected target belongs, not removing the second detected target from the dataset; when the first parameter of the detection frame corresponding to the second detected target is less than the first preset category threshold of the category to which the second detected target belongs, obtaining the first ratio and the second ratio, and detecting whether each of the first ratio and the second ratio is greater than a second preset ratio when each of the first ratio and the second ratio is greater than the second preset ratio, removing the second detected target from the dataset; when at least one of the first ratio and the second ratio is less than or equal to the second preset ratio, detecting whether the first ratio is greater than a third preset ratio, and detecting whether the first parameter of the second detection frame corresponding to the second detected target is less than the second preset category threshold, wherein $THR_5=ave_2-\gamma\times std_2$, $THR_5$ represents the second preset category threshold of the category to which the second detected target belongs, $\gamma$ is the value selected from a range from 1 to 3, $ave_2$ represents an average value of the first parameters of respective detection frames corresponding respectively to the respective detected targets in the category to which the second detected target belongs, and $std_2$ represents a variance of the first parameters of the respective detection frames corresponding respectively to the respective detected targets in the category to which the second detected target belongs; if the first ratio is greater than the third preset ratio and it is detected that the first parameter of the second detection frame corresponding to the second detected target is less than the second preset category threshold, removing the second detected target from the dataset; if the first ratio is less than or equal to the third preset ratio and it is detected that the first parameter of the second detection frame corresponding to the second detected target is greater than or equal to the second preset category threshold, not removing the second detected target from the dataset; and if the first ratio is less than or equal to the third preset ratio and it is detected that the first ratio is greater than a fourth preset ratio, removing the second detected target from the dataset; otherwise, not removing the second detected target from the dataset.

According to an embodiment of the present disclosure, when the first parameter of the first detection frame corresponding to the first detected target does not satisfy the preset category condition of the category to which the first detected target belongs, removing the first detected target from the dataset.

In another aspect, the present disclosure provides an image processing device for multi-object detection, including: an obtaining circuit configured to obtain an image including a plurality of targets and detecting the plurality of targets included in the image, obtain categories of the plurality of detected targets and first parameters of respective detection frames corresponding to the respective plurality of detected targets respectively, and rank the plurality of detected targets according to the first parameters in a descending order to obtain a dataset; a first detecting circuit configured to obtain a target with a highest first parameter in the dataset as a first detected target, and detect whether a first parameter of a first detection frame corresponding to the first detected target satisfies a preset category condition of a category to which the first detected target belongs; a second detecting circuit configured to detect whether the first detection frame corresponding to the first detected target overlaps with a detection frame corresponding to another target among the plurality of detected targets except the first detected target, when the first detecting circuit detects that the first parameter of the first detection frame corresponding to the first detected target satisfies the preset category condition of the category to which the first detected target belongs; a third detecting circuit configured to record the other target as a second detected target, when the first detection frame overlaps with the detection frame corresponding to the other target, compare whether the category of the first detected target is a same as that of the second detected target, and select a corresponding method according to a result of comparing the category of the first detected target with that of the second detected target, to determine whether to remove the second detected target from the dataset; a removing circuit configured to remove the second detected target from the dataset when the third detecting circuit determines that the second detected target should be removed from the dataset; and a traversing circuit configured to traverse each target in the dataset by using a preset method.

According to an embodiment of the present disclosure, the first detecting circuit includes: a first detecting sub-circuit configured to detect whether the first parameter of the first detection frame corresponding to the first detected target is greater than a larger one of first and second thresholds, wherein $THR_2 \times ave_1 - \gamma \times std_1$, $THR_2$ represents the second threshold, $\gamma$ is a value selected from a range from 1 to 3, $ave_1$ represents an average value of first parameters of respective detection frames corresponding respectively to respective detected targets in the category to which the first detected target belongs, and $std_1$ represents a variance of the first parameters of the respective detection frames corresponding respectively to the respective detected targets in the category to which the first detected target belongs; a second detecting sub-circuit configured to detect whether the first detected target is a detected target in the category to which the first detected target belongs to be firstly processed in the dataset when the first detecting sub-circuit detects that the first parameter of the first detection frame corresponding to the first detected target is greater than the larger one of the first and second thresholds; and a third detecting sub-circuit configured to, when the second detecting sub-circuit detects that the first detected target is not the detected target in the category to which the first detected target belongs to be firstly processed in the dataset, detect whether a difference between the first parameter of the first detection frame corresponding to the first detected target and a first parameter of a detection frame corresponding to a previous processed detected target in the category to which the first detected target belongs is less than a third threshold.

According to an embodiment of the present disclosure, the third detecting circuit includes: a fifth detecting sub-circuit configured to detect whether the category of the first detected target is the same as that of the second detected target; a sixth detecting sub-circuit configured to, when the fifth detecting sub-circuit detects that the category of the first detected target is the same as that of the second detected target, determine whether to remove the second detected target from the dataset, according to a comparison result of the first parameter of the first detection frame corresponding to the first detected target to a first preset category threshold of the category to which the first and second detected targets belong, a comparison result of the first parameter of a second detection frame corresponding to the second detected target to the first preset category threshold, a ratios of an overlapping area between the first detection frame and a second detection frame corresponding to the second detected target, to an area of the first detection frame and an area of the second detection frame respectively; wherein the respective ratios of the overlapping area between the first and second detection frames to the respective areas of the first and second detection frames are recorded as a first ratio and a second ratio respectively; and a seventh detecting sub-circuit configured to, when the fifth detecting sub-circuit detects that the category of the first detected target is different from that of the second detected target, determine whether to remove the second detected target from the dataset according to a comparison result of the first parameter of the first detection frame corresponding to the first detected target to a first preset category threshold of the category to which the first and second detected targets belong, a comparison result of the first parameter of the second detection frame corresponding to the second detected target to the first preset category threshold, the first ratio and the second ratio, and a comparison result of the first parameter of the second detection frame corresponding to the second detected target to a second preset category threshold.

According to an embodiment of the present disclosure, the sixth detecting sub-circuit is further configured to detect whether the first parameters of the respective detection frames corresponding respectively to the first and second detected targets are both greater than the first preset category threshold of the category to which the first and second detected targets belong, wherein $THR_4=ave_1+2\times std_1$, $THR_4$ represents the first preset category threshold of the category to which the first and second detected targets belong, $ave_1$ represents the average value of the first parameters of the respective detection frames corresponding respectively to the respective detected targets in the category to which the first detected target belongs, and $std_1$ represents the variance of the first parameters of the respective detection frames corresponding respectively to the respective detected targets in the category to which the first detected target belongs; when the first parameters of the respective detection frames corresponding respectively to the first and second detected targets are both greater than the first preset category threshold, not remove the second detected target from the dataset; and when the first parameter of the second detection frame corresponding to the second detected target is less than the first preset category threshold, calculating the first ratio and the second ratio, and detecting whether a greater ratio of the first ratio and the second ratio is greater than a first preset ratio, and remove the second detected target from the dataset in a case that the greater ratio of the first ratio and the second ratio is greater than the first preset ratio; otherwise, not remove the second detected target from the dataset.

According to an embodiment of the present disclosure, the seventh detecting sub-circuit is further configured to detect whether the first parameter of the first detection frame corresponding to the first detected target is greater than the first preset category threshold of the category to which the first detected target belongs and the first parameter of a detection frame corresponding to the second detected target is greater than the first preset category threshold of the category to which the second detected target belongs; when the first parameter of the first detection frame corresponding to the first detected target is greater than the first preset category threshold of the category to which the first detected target belongs and the first parameter of the second detection frame corresponding to the second detected target is greater than the first preset category threshold of the category to which the second detected target belongs, not remove the second detected target from the dataset; when the first parameter of the second detection frame corresponding to the second detected target is less than the first preset category threshold of the category to which the second detected target belongs, obtain the first ratio and the second ratio, and detect whether each of the first ratio and the second ratio is greater than a second preset ratio; when each of the first ratio and the second ratio is greater than the second preset ratio, remove the second detected target from the dataset; when at least one of the first ratio and the second ratio is less than or equal to the second preset ratio, detect whether the first ratio is greater than a third preset ratio, and detecting whether the first parameter of the second detection frame corresponding to the second detected target is less than the second preset category threshold, wherein $THR_5=ave_2-\gamma\times std_2$, $THR_5$ represents the second preset category threshold of the category to which the second detected target belongs, $\gamma$ is the value selected from a range from 1 to 3, $ave_2$ represents an average value of first parameters of respective detection frames corresponding respectively to respective detected targets in the category to which the second detected target belongs, and $std_2$ represents a variance of the first parameters of the respective detection frames corresponding respectively to the respective detected targets in the category to which the second detected target belongs represents a variance of the first parameters of the detection frames corresponding to the respective detected targets in the category to which the second detected target belongs; if the first ratio is greater than the third preset ratio and it is detected that the first parameter of the second detection frame corresponding to the second detected target is less than the second preset category threshold, remove the second detected target from the dataset; and if the first ratio is less than or equal to the third preset ratio and it is detected that the first ratio is greater than a fourth preset ratio, remove the second detected target from the dataset; otherwise, not remove the second detected target from the dataset.

In another aspect, the present disclosure provides an image processing device, including: a memory, one or more processors, and computer instructions stored in the memory, the one or more processors being configured, when executing the computer instructions, to implement one or more steps of the above-mentioned image processing method for multi-object detection.

In another aspect, the present disclosure provides a computer-readable storage medium having computer instructions stored thereon that, when executed by a processor, cause the processor to implement one or more steps of the above-mentioned image processing method for multi-object detection.

BRIEF DESCRIPTION OF THE FIGURES

The following drawings are merely examples for illustrative purposes according to various disclosed embodiments and are not intended to limit the scope of the present disclosure. In the drawings.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Figure 1:
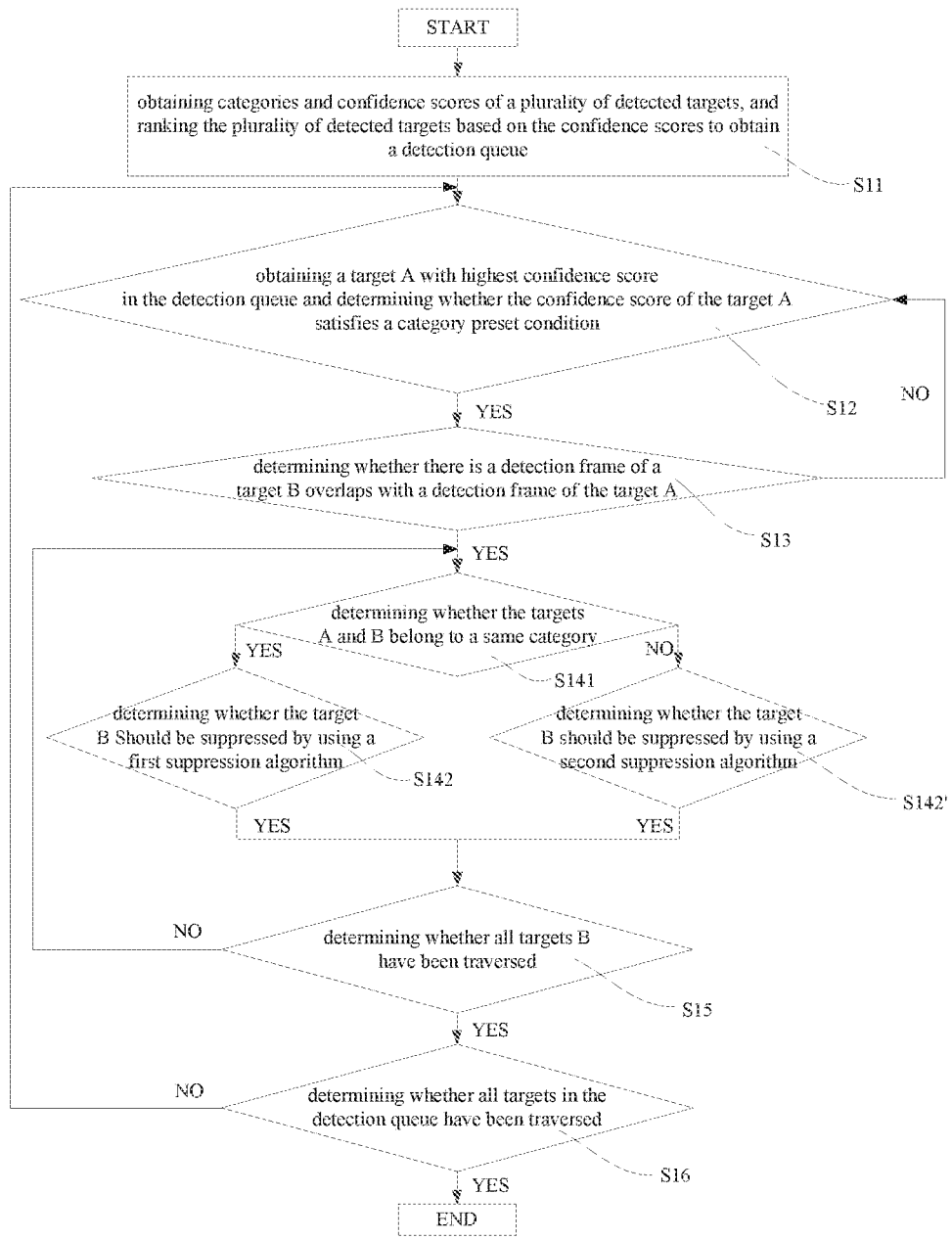
FIG. 1 is a flowchart of a non-maximum suppression method for multi-object detection according to an embodiment of the present disclosure.

FIG. 1 is a flowchart of a non-maximum suppression method for multi-object detection according to an embodiment of the present disclosure. The non-maximum suppression method for multi-object detection of the present disclosure may be applied to detection of goods on the shelves in supermarkets and shopping malls, detection of pedestrians or road signs, and the like.

With reference to FIG. 1, in some embodiments, the non-maximum suppression method for multi-object detection specifically includes the following steps S11 to S16.

In step S11, categories and confidence scores of a plurality of detected targets in a display image are obtained, and the plurality of detected targets are ranked according to the confidence scores to obtain a detection queue.

In some embodiments, step S11 may include: obtaining a detection frame of each target in the display image, and determining respective targets in the detection frame as well as the categories and confidence scores of the respective targets; and ranking the respective targets according to the confidence scores to obtain the detection queue. The confidence scores of the respective targets may be ranked in an increasing order or a decreasing order. For ease of explanation, the respective targets in the detection queue are ranked in an increasing order of the confidence scores.

In some embodiments, the categories of the targets include but are not limited to: goods such as drinks, office supplies and food, pedestrians, road signs, and the like. In some embodiments, the plurality of detected targets may include, for example, drinks and the like in a vending machine.

As used herein, the term "detection frame" refers to a region corresponding to a detected target, that is, the detection frame is a region having a certain area and including one or more detected targets.

In step S12, the target with the highest confidence score in the detection queue is obtained, and marked as target A, and it is determined whether the confidence score of the target A satisfies a preset category condition of the category to which the target A belongs. It should be noted that, for ease of description, the target with the highest confidence score in the detection queue is represented by the target A. However, the description of "marking the target with the highest confidence score in the detection queue as target A" does not mean any processing performed on the target.

In some embodiments, the preset category condition may be specifically set according to a specific detection scenario. In some embodiments, the preset category condition may be a threshold corresponding to the respective category.

In some embodiments, step S12 may be implemented by steps S121 to S124.

In step S121, it is determined whether the confidence score of the target A is greater than a first threshold. The first threshold may be obtained according to experience. For example, the first threshold may be 0.1.

In some embodiments, in a case where the category to which the target A belongs is k and the first threshold is represented by $THR_1$, if the confidence score of the target A is less than or equal to the first threshold $THR_1$, the target A is suppressed; and if the confidence score of the target A is greater than the threshold $THR_1$, step S122 is executed.

It is needed to be explained here that if a certain target is suppressed, the information about this target will not be output after the execution of the method described herein, that is, the category, confidence score, position information of the detection frame and the like of the target will not be output. If a target is not suppressed, it means that the target is retained, that is, the information about the target will be output after the execution of the method described herein, that is, the category, confidence score, position information of the detection frame and the like of the target will be output.

In step S122, it is determined whether the confidence score of the target A is greater than a second threshold $THR_2$. $THR_2 = ave_1 - \gamma \times std_1$, $\gamma$ is a value selected from a range from 1 to 3, $ave_1$ represents an average value of the confidence scores of the targets in the category (e.g., the category k) to which the target A belongs, and $std_1$ represents a variance of the confidence scores of the targets in the category (e.g., the category k) to which the target A belongs. If it is determined in step S122 that the confidence score of the target A is less than or equal to the second threshold $THR_2$, the target A is suppressed; if it is determined in step S122 that the confidence score of the target A is greater than the second threshold $THR_2$, step S123 is executed.

In some embodiments, the second threshold $THR_2$ and the average value and variance of the confidence scores of the targets in the category k used to calculate the second threshold $THR_2$ in step S122 may be calculated before step S122 is executed. Specifically, the second threshold $THR_2$ and the average value and variance of the confidence scores of the targets in the category k used to calculate the second threshold $THR_2$ in step S122 may be calculated before step S121. In addition, it should be noted that the value of $\gamma$ may be specifically set according to the specific detection scenario.

In step S123, it is determined whether the target A is a target in the category (e.g., the category k) to which the target A belongs to be firstly processed in the detection queue; that is, in step S123, it is determined whether the target A is the first target to perform steps S121 and S122. If not, step S124 is executed; otherwise, step S13 is executed.

In step S124, it is determined whether a difference between the confidence score of the target A and the confidence score of a previous processed target in the category (e.g., the category k) to which the target A belongs is greater than the third threshold $THR_3$. The third threshold $THR_3$ may be obtained according to experience. For example, the first threshold $THR_3$ may be 0.3. If the difference is less than the third threshold $THR_3$, step S13 is executed.

In step S13, it is determined whether the detection frame of the target A overlaps with detection frames of other targets among the plurality of targets. Here, the expression of "one target overlaps with the other target" means that a detection frame (sometimes referred as a detection area) corresponding to the one target and a detection frame corresponding to the other target have a common region. If it is determined that the detection frames of other targets overlap with the detection frame of the target A, step S14 is executed (step S13 is YES); otherwise, the target A is removed from the detection queue to obtain a new current detection queue, and it is returned back to step S2 (step S13 is NO).

It should be noted here that, for simplicity of description, in this embodiment, a target having a detection frame overlapped with the detection frame of the target A is represented by target B. The number of the target B may be one or more. Herein, only one target B will be described as an example.

In step S14, it is determined whether the targets A and B belong to a same category, and according to the determining result, a corresponding suppression algorithm (e.g., a first suppression algorithm and a second suppression algorithm described below) is used to determine whether the target B should be suppressed. If the targets A and B belong to the same category, the first suppression algorithm is used to determine whether the target B should be suppressed (step S141 is YES); otherwise, the second suppression algorithm is used to determine whether the target B should be suppressed.

Specifically, step S14 may be implemented by steps S141, S142, and S142'.

In step S141, it is determined whether the targets A and B belong to the same category. If so, step S42 is executed (step S141 is YES), that is, the first suppression algorithm is used to determine whether the target B should be suppressed; otherwise, step S142' is executed (step S141 is NO), that is, the second suppression algorithm is used to determine whether the target B should be suppressed.

In step S142, it is determined whether the target B should be suppressed according to a comparison result of the confidence score of the target A to a first preset category threshold of the category (e.g., the category k) to which the targets A and B belong, a comparison result of the confidence score of the target B to the first preset category threshold, a ratio (represented as a first ratio below) of an overlapping area between the detection frames of the targets A and B to an area of the detection frame of the target A and a ratio (represented as a second ratio below) of the overlapping area to an area of the detection frame of the target B. Here, the overlapping area refers to, for example, an area of a common region of the detection frames of the targets A and B. If it is determined that the target B should be suppressed, the targets B and A are all removed from the detection queue to obtain a current detection queue which is used as a new detection queue in step S12, and it is returned back to step S12 to traverse the remaining targets in the new detection queue according to steps S12 to S14. If it is determined that the target B should be retained, the target A is removed from the detection queue to obtain a current detection queue which is used as a new detection queue in step S12, and it is returned back to step S12 to traverse the remaining targets in the new detection queue according to steps S12 to S14.

Specifically, in some embodiments, step S142 may be implemented by steps S1421 to S1422.

In step S1421, it is determined whether the confidence score of the target A and the confidence score of the target B are both greater than the first preset category threshold $THR_4$ of the category k to which the targets A and B belong. $THR_4 = ave_1 + 2 \times std_1$, $ave_1$ represents the average value of the confidence scores of the targets in the category k to which the target A belongs, and $std_1$ represents the variance of the confidence scores of the targets in the category k. If it is determined that the confidence scores of the targets A and B are both greater than the first preset category threshold $THR_4$ of the category k, the target B is retained and the target A is removed from the detection queue to obtain the current detection queue which is used as a new detection queue in step S12, and it is returned back to step S12 to traverse the remaining targets in the new detection queue according to steps S12 to S14. If it is determined that the confidence score of the target B is less than the first preset category threshold $THR_4$ of the category k, step S1422 is executed.

It should be noted herein that $ave_1$ and $std_1$ used in step S1421 are the same as that used in step S122, and thus both $ave_1$ and $std_1$ may be calculated before step S121. In addition, $ave_1$ and $std_1$ may also be calculated during usage. If the first preset category threshold $THR_4$ calculated by the above formula is not a value that is greater than 0.9 and less than 0.98, it is considered that the first preset category threshold $THR_4$ is equal to 0.9 when the calculated first preset category threshold $THR_4$ is less than or equal to 0.9, and it is considered that the first preset category threshold $THR_4$ is equal to 0.98 when the calculated first preset category threshold $THR_4$ is greater than or equal to 0.98.

In step S1422, the ratios of the overlapping area between the detection frames of the target A and B to the areas of the respective detection frames of the targets A and B are respectively calculated as the first ratio and the second ratio, and it is determined whether a greater one of the first and second ratios is greater than a first preset ratio. If the greater one of the first and second ratios is greater than the first preset ratio, the target B is suppressed.

In some embodiments, step S1422 may include: obtaining an area S1 of the detection frame of the target A, an area S2 of the detection frame of the target B, and an overlapping area S3 between the detection frames of the targets A and B; calculating a ratio of S1 to S3 to obtain a ratio $OverlapRatio_i$ of the overlapping area S3 to the area S1; similarly, calculating a ratio of S2 to S3 to obtain a ratio $OverlapRatio_j$ of the overlapping area S3 to the area S2, and using the greater value of the $OverlapRatio_i$ and the ratio $OverlapRatio_j$ as $OverlapRatio_{max}$; comparing $OverlapRatio_{max}$ with the first preset ratio. The first preset ratio may be equal to 0.8. If $OverlapRatio_{max}$ is greater than 0.8, the target B is suppressed. At this time, the target B and the target A are removed from the detection queue to obtain the current detection queue which is used as a new detection queue in step S12, and it is returned back to step S12 to traverse the remaining targets in the detection queue. If the target B is retained, the target A is removed from the detection queue to obtain the current detection queue which is used as a new detection queue in step S12, and it is returned back to step S12 to traverse all the targets in the detection queue according to steps S12 to S14.

In step S142', it is determined whether the target B should be suppressed according to a comparison result of the confidence score of the target A to a first preset category threshold of the category to which the target A belongs, a comparison result of the confidence score of the target B to a first preset category threshold of the category to which the target B belongs, a ratio (represented as a first ratio below) of an overlapping area between the detection frames of the targets A and B to an area of the detection frame of the target A, a ratio (represented as a second ratio below) of the overlapping area to an area of the detection frame of the target B, and a comparison result of the confidence score of the target B to a second preset category threshold. If it is determined that the target B should be suppressed, the target B and the target A are all removed from the detection queue to obtain the current detection queue which is used as a new detection queue in step S12, and it is returned back to step S12 to traverse all targets in the new detection queue according to steps S12 to S14. If it is determined that the target B is retained, the target A is removed from the detection queue to obtain the current detection queue which is used as a new detection queue in step S12, and it is returned back to step S12 to traverse the remaining targets in the new detection queue according to steps S12 to S14.

Specifically, in some embodiments, step S142' may be implemented by steps S1421' to S1422'.

In step S1421', it is determined whether the confidence score of the target A is greater than the first preset category threshold of the category to which the target A belongs and whether the confidence score of the target B is greater than the first preset category threshold of the category to which the target B belongs. The category of target A is k, the category of target B is m, the first preset category threshold of category k is $THR_{4k}$, and the first preset category threshold of category m is $THR_{4m}$. If the confidence score of target A is greater than the first preset category threshold $THR_{4m}$ of category k and the confidence score of target B is greater than the first preset category threshold $THR_{4m}$ of category m, target B is retained, and target A is removed from the detection queue to obtain the current detection queue which is used as a new detection queue in step S12, and it is returned back to step S12 to traverse the remaining targets in the new detection queue according to steps S12 to S14, if the confidence score of target B is less than the first preset category threshold $THR_{4m}$ of category m, S1422' is executed.

In step S1422', the ratios of the overlapping area between the detection frames of the target A and B to the areas of the respective detection frames of the targets A and B are respectively calculated as the first ratio and the second ratio, and it is determined whether the first and second ratios are both greater than a second preset ratio. If the first and second ratios are both greater than the second preset ratio, the target B is suppressed, the target B and the target A are all removed from the detection queue to obtain the current detection queue which is used as a new detection queue in step S12, and it is returned back to step S12 to traverse the remaining targets in the new detection queue according to steps S12 to S14. If it is determined that at least one of the first and second ratios is less than or equal to the second preset ratio, step S1423' is executed.

In some embodiments, step S1422' may include: obtaining an area S1 of the detection frame of the target A, an area S2 of the detection frame of the target B, and an overlapping area S3 between the detection frames of the targets A and B; calculating a ratio of S1 to S3 to obtain a ratio $OverlapRatio_i$ of the overlapping area S3 to the area S1; similarly, calculating a ratio of S2 to S3 to obtain a ratio $OverlapRatio_j$ of the overlapping area S3 to the area S2, and comparing $OverlapRatio_i$ and $OverlapRatio_j$ with the second preset ratio, respectively. The second preset ratio may be equal to 0.9. If $OverlapRatio_i$ and $OverlapRatio_j$ are both greater than 0.9, the target B is suppressed. At this time, the target B and the target A are removed from the detection queue to obtain the current detection queue which is used as a new detection queue in step S12, and it is returned back to step S12 to traverse the remaining targets in the new detection queue according to steps S12 to S14. If it is determined that at least one of $OverlapRatio_i$ and $OverlapRatio_j$ is less than or equal to the second preset ratio, step S1423' is executed.

In step S1423', it is determined whether the ratio $OverlapRatio_i$ of the overlapping area between the detection frames of the targets A and B to the area of the detection frame of the target A is greater than a third preset ratio, and whether the confidence score of the target B is less than the second preset category threshold $THR_5$. The third preset ratio may be 0.9, the third preset ratio may be set according to the specific detection scenario, and $THR_5=ave_2-\gamma \times std_2$. $THR_5$ represents the second preset category threshold of the category to which the target B belongs, γ is any value selected from a range from 1 to 3, $ave_2$ represents an average value of confidence scores of respective targets in the category to which the target B belongs, and $std_2$ represents a variance of the confidence scores of the respective targets in the category to which the target B belongs. If the ratio $OverlapRatio_i$ is greater than the third preset ratio, and the confidence score of the target B is less than the second preset category threshold, the target B is suppressed. γ is any value selected from a range from 1 to 3, $ave_2$ represents an average value of confidence scores of respective targets in the category in to which the target B belongs, and $std_2$ represents a variance of the confidence scores of the respective targets in the category m to which the target B belongs. If the ratio $OverlapRatio_i$ is less than or equal to the third preset ratio and greater than a fourth preset ratio, the target B is suppressed. The fourth preset ratio may be 0.8, and the fourth preset ratio is set according to the specific detection scenario. In this step, if the target B is suppressed, the target B and the target A are removed from the detection queue to obtain the current detection queue which is used as a new detection queue in step S12, and it is returned to step S12 to traverse the remaining targets in the new detection queue according to steps S12 to S14. If the target B is retained in this step, the target A is removed from the detection queue to obtain the current detection queue which is used as a new detection queue in step S12, and it is returned to step S12 to traverse the remaining targets in the new detection queue according to steps S12 to S14. After the traversal of all the targets in the detection queue is completed, the categories, confidence scores, and position information of the detection frames of the targets that are not suppressed are output. The position information of the detection frame may be coordinate information of two diagonal corners of the detection frame. Alternatively, the position information of the detection frame may also be position information of four diagonal corners of the detection frame.

It should be noted that the above steps are described in a case where the detection queue includes only one target B as an example. If a plurality of targets B are included in the detection queue, it is returned back to step S13 after completing the step of determining whether one of the plurality of targets B should be suppressed, as step S15 shown in FIG. 1, and all the targets B are traversed according to the above steps S13 and S14, until all the targets B have been detected. It is returned back to step S12 to traverse the remaining targets in the detection queue, as step S16 shown in FIG. 1.

According to the non-maximum suppression method for multi-object detection of the present disclosure, the targets that belong to the same or different categories are suppressed according to the confidence scores and the overlapping area between the detected targets, respectively. The improved non-maximum suppression algorithm effectively improves the accuracy of the algorithms for dense multi-target detection.

Figure 2:
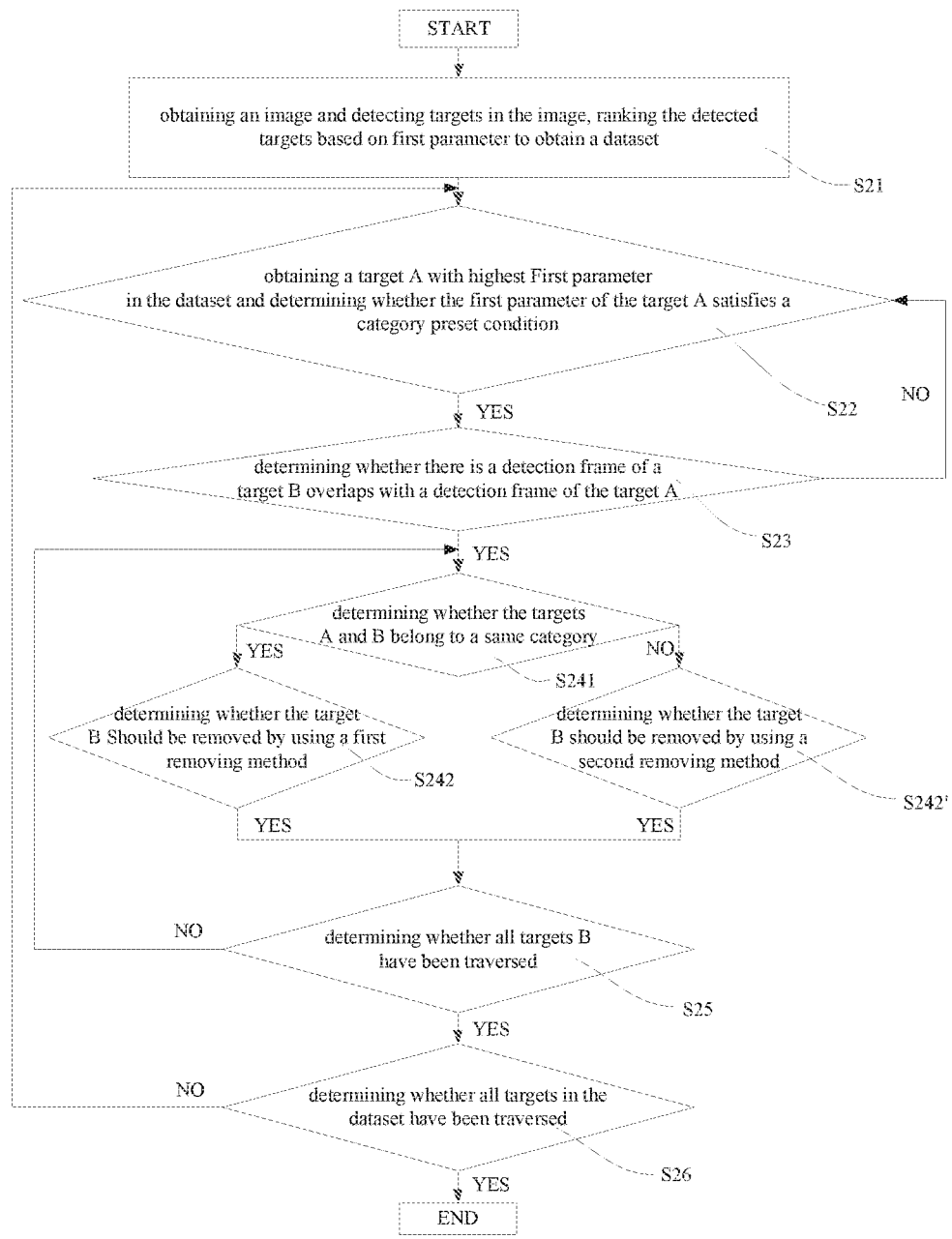
FIG. 2 is a flowchart of an image processing method for multi-object detection according to an embodiment of the present disclosure.

FIG. 2 is a flowchart of an image processing method for multi-object detection according to an embodiment of the present disclosure. In the present application, the image processing method may be implemented by the non-maximum suppression method described above. For clarity, the repetition description of related content will be omitted below.

With reference to FIG. 2, in some embodiments, the image processing method for multi-object detection may include the following steps S21 to S26.

In step S21, an image including a plurality of targets to be detected is obtained, and the plurality of targets included in the image are detected; categories of the plurality of detected targets and first parameters of respective detection frames corresponding to the respective plurality of detected targets respectively are obtained; the plurality of detected targets are ranked according to the first parameters in a certain order to obtain a dataset. The first parameters may be, for example, the confidence scores of the respective detected target described with reference to FIG. 1, and the dataset is, for example, the detection queue described with reference to FIG. 1.

It should be noted here that the plurality of detected targets may be ranked according to the first parameters from high to low (i.e., in a descending order), or the plurality of detected targets may be ranked according to the first parameters from low to high (i.e., in an ascending order). For ease of description, the plurality of detected targets in the dataset here are ranked from high to low according to the first parameters.

In some embodiments, the categories of the targets may include but are not limited to: goods such as drinks, office supplies and food, pedestrians, road signs, or the like. In some embodiments, the plurality of detected targets may include, for example, drinks and the like in a vending machine.

In step S22, the target with the highest first parameter in the dataset is obtained, and marked as a target A, and it is detected whether the first parameter of the target A satisfies a preset category condition of the category to which the target A belongs.

In some embodiments, the preset category condition may be specifically set according to a specific detection scenario. In some embodiments, the preset category condition may be a threshold corresponding to each category.

In some embodiments, when the first parameter of the detection frame corresponding to the target A does not satisfy the preset category condition of the category to which the target A belongs, the target A is removed from the dataset. Otherwise, when the first parameter of the detection frame corresponding to the target A satisfies the preset category condition of the category to which the target A belongs, the method proceeds to step S23.

Specifically, in some embodiments, step S22 may be implemented using steps S121 to S124 described above with reference to FIG. 1 and will not be repeated here.

In step S23, it is detected whether the detection frame corresponding to the target A overlaps with a detection frame corresponding to another target among the plurality of detected targets. When the detection frame corresponding to the target A overlaps the detection frame corresponding to the other target among the plurality of detected targets, the other target is recorded as a target B, and the method proceeds to step S241; when the detection frame corresponding to the target A does not overlap the detection frame corresponding to the other target among the plurality of detected targets, the method returns to step S22.

In step S241, it is compared whether a category of the target A and a category of the target B are the same. When the category of target A is the same as the category of target B, the method proceeds to step S242; otherwise, the method proceeds to step S242'.

In step S242, a first removing method is used to determine whether the target B is removed. Specifically, in some embodiments, it is determined whether the target B should be removed from the dataset according to a comparison result of the first parameter of the detection frame corresponding to the target A to a first preset category threshold of the category to which the targets A and B belong, a comparison result of the first parameter of the detection frame corresponding to the target B to the first preset category threshold, a ratio of an overlapping area between the detection frame corresponding to the target A and the detection frame corresponding to the target B to an area of the detection frame corresponding to the target A, and a ratio of the overlapping area between the detection frame corresponding to the target A and the detection frame corresponding to the target B to an area of the detection frame corresponding to the target B. The respective ratios of the overlapping area between the detection frame corresponding to the target A and the detection frame corresponding to the target B to the respective areas of the detection frame corresponding to the target A and the detection frame corresponding to the target B are recorded as a first ratio and a second ratio respectively.

In some embodiments, determining whether the target B should be removed from the dataset may include detecting whether the first parameter of the detection frame corresponding to the target A and the first parameter of the detection frame corresponding to the target B are both greater than the first preset category threshold of the category to which the targets A and B belong. $THR_4 = ave_1 + 2 \times std_1$, $THR_4$ represents the first preset category threshold of the category to which the targets A and B belong, $ave_1$ represents an average value of the first parameters of the respective detection frames corresponding respectively to the respective detected targets in the category to which the target A belongs, and $std_1$ represents a variance of the first parameters of the respective detection frames corresponding respectively to the respective detected targets in the category to which the target A belongs. When the first parameter of the detection frame corresponding to each of the targets A and B is greater than the first preset category threshold, the target B is not removed from the dataset; when the first parameter of the detection frame corresponding to the target B is less than the first preset category threshold, calculating the first ratio and the second ratio, and detecting whether a greater ratio of the first ratio and the second ratio is greater than a first preset ratio, and the target B is removed from the dataset in a case that the greater ratio of the first ratio and the second ratio is greater than the first preset ratio; otherwise, the target B is not removed from the dataset. Then, a new dataset will be obtained and the method proceeds to step S25.

In step S242', a second removing method is used to determine whether the target B is removed. Specifically, in some embodiments, it is determined whether the target B should be removed from the dataset according to a comparison result of the first parameter of the detection frame corresponding to the target A to a first preset category threshold of the category to which the target A belongs, a comparison result of the first parameter of the detection frame corresponding to the target B to a first preset category threshold of the category to which the target B belongs, a ratio of an overlapping area between the detection frame corresponding to the target A and the detection frame corresponding to the target B to an area of the detection frame corresponding to the target A, a ratio of the overlapping area between the detection frame corresponding to the target A and the detection frame corresponding to the target B to an area of the detection frame corresponding to the target B, and a comparison result of the first parameter of the detection frame corresponding to the target B to the second preset category threshold.

In some embodiments, determining whether the target B should be removed from the dataset may include detecting whether the first parameter of the detection frame corresponding to the target A is greater than the first preset category threshold of the category to which the target A belongs, and the first parameter of the detection frame corresponding to the target B is greater than the first preset category threshold of the category to which the target B belongs. When the first parameter of the detection frame corresponding to the target A is greater than the first preset category threshold of the category to which the target A belongs, and the first parameter of the detection frame corresponding to the target B is greater than the first preset category threshold of the category to which the target B belongs, the target B is not removed from the dataset. When the first parameter of the detection frame corresponding to the target B is less than the first preset category threshold of the category to which the target B belongs, calculating the first ratio and the second ratio, and detecting whether the first ratio and the second ratio are both greater than the second preset ratio. When each of the first ratio and the second ratio is greater than the second preset ratio, the target B is removed from the dataset. When at least one of the first ratio and the second ratio is less than or equal to the second preset ratio, detecting whether the first ratio is greater than a third preset ratio, and detecting whether the first parameter of the detection frame corresponding to the target B is less than the second preset category threshold $THR_5=ave_2-\gamma \times std_2$. $THR_5$ represents the second preset category threshold of the category to which the target B belongs, $\gamma$ is any value selected from a range from 1 to 3, $ave_2$ represents an average value of first parameters of respective detection frames corresponding respectively to respective detected targets in the category to which the target B belongs, and $std_2$ represents a variance of the first parameters of the respective detection frames corresponding respectively to the respective detected targets in the category to which the target B belongs. If the first ratio is greater than the third preset ratio and it is detected that the first parameter of the detection frame corresponding to the target B is less than the second preset category threshold, the target B is removed from the dataset. If the first ratio is less than or equal to the third preset ratio and it is detected that the first parameter of the detection frame corresponding to the target B is greater than or equal to the second preset category threshold, the target B is not removed from the dataset. If the first ratio is less than or equal to the third preset ratio and it is detected that the first ratio is greater than a fourth preset ratio, the target B is removed from the dataset; otherwise, the target B is not removed from the dataset. Then, a new dataset is obtained and the method proceeds to step S25.

In step S25, it is detected whether all targets B in the dataset are traversed completely; and in step S26, it is detected whether all targets in the dataset are traversed completely. It is to be noted that, those skilled in the art can easily think of implementing steps S25 and S26 according to steps S15 and S16 described with reference to FIG. 1, and the repetition description will be omitted here.

According to the image processing method for multi-object detection of the present disclosure, the targets that belong to the same or different categories are removed according to the first parameters (e.g., the confidence scores) and the overlapping area between the detected targets, respectively. The improved image processing method effectively improves the accuracy of the method for dense multi-target detection.

Figure 3:
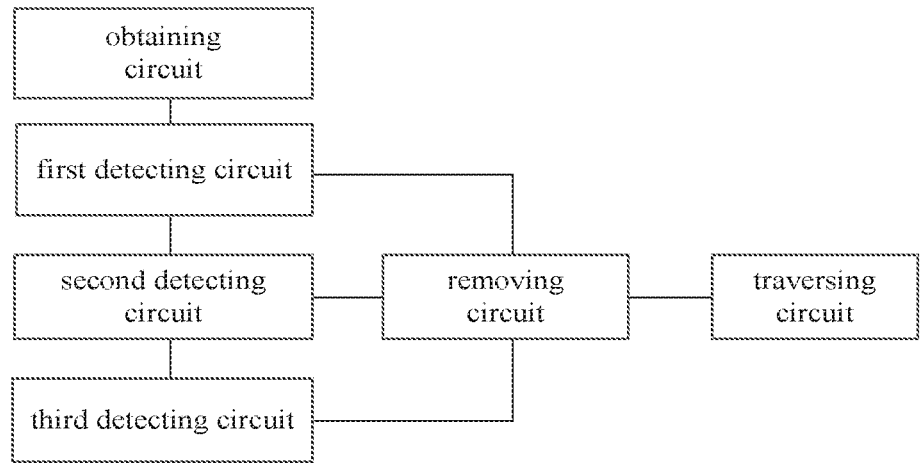
FIG. 3 is a diagram of an image processing device for multi-object detection according to an embodiment of the present disclosure.

FIG. 3 is a diagram of an image processing device for multi-object detection according to an embodiment of the present disclosure. The image processing device for multi-object detection may be used to implement the image processing device method for multi-object detection described herein. As shown in FIG. 3, in some embodiments, the non-maximum suppression device includes: an obtaining circuit, a first detecting circuit, a second detecting circuit, a third detecting circuit, a suppression circuit and a traversing circuit.

In some embodiments, the obtaining circuit is configured to obtain an image including a plurality of targets and detecting the plurality of targets included in the image, obtain categories of the plurality of detected targets and first parameters of respective detection frames corresponding to the respective plurality of detected targets respectively, and rank the plurality of detected targets according to the first parameters in a descending order to obtain a dataset. The first parameter may include, for example, a confidence score of one of the plurality of detected targets.

In some embodiments, the first detecting circuit is configured to obtain a target with a highest first parameter in the dataset, which is marked as target A, and determine whether the first parameter of the target A satisfies a preset category condition of the category to which the target A belongs.

In some embodiments, the second detecting circuit is configured to, when the first detecting circuit determines that the first parameter of the target A satisfies the preset category condition of the category to which the target A belongs, detect whether the detection frame corresponding to the target A overlaps with a detection frame corresponding to another target among the plurality of detected targets.

In some embodiments, the third detecting circuit is configured to, when the second detecting circuit detects that the detection frame corresponding to the target A overlaps with the detection frame corresponding to the other target, record the target having the detection frame overlapped with the detection frame corresponding to the target A as target B, compare (e.g., determine) whether the target A and the target B belong to a same category, and determine whether the target B should be removed from the dataset by selecting a corresponding method (e.g., a suppression algorithm) according to the result of comparing whether the target A and the target B belong to the same category.

In some embodiments, the removing circuit is configured to remove the target B from the dataset when the third detecting circuit determines that the target B should be removed from the dataset.

In some embodiments, the traversing circuit is configured to traverse each target in the dataset by using a preset method. The predetermined method here may be the non-maximum suppression method or the image processing method described herein.

Figure 4:
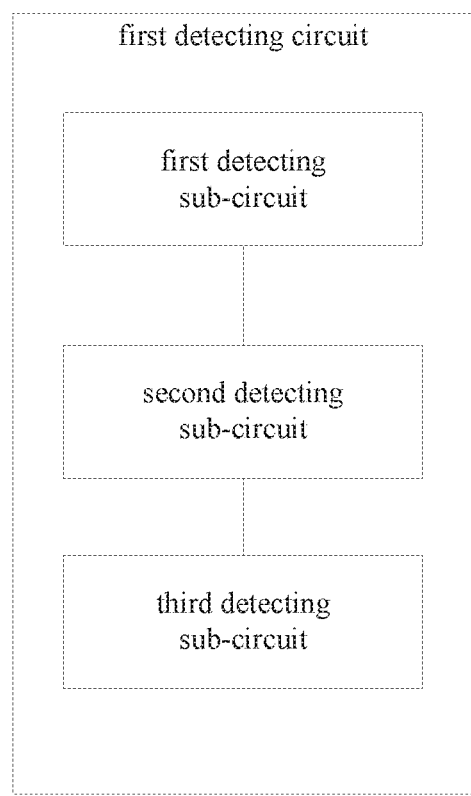
FIG. 4 is a diagram of a first detecting circuit in an image processing device for multi-object detection according to an embodiment of the present disclosure.

FIG. 4 is a diagram of a first detecting circuit in an image processing device for multi-object detection according to an embodiment of the present disclosure. As shown in FIG. 4, in some embodiments, the first detecting circuit may include a first detecting sub-circuit, a second detecting sub-circuit, and a third detecting sub-circuit. Here, the circuits and sub-circuits described herein may be implemented by one or more integrated circuits, controllers, microcontrollers, logic comparators, processors, microprocessors, NAND gates and the like that implement the methods described herein.

In some embodiments, the first detecting sub-circuit is configured to determine whether the first parameter corresponding to the target A is greater than a larger one of first and second thresholds. The first threshold may be obtained according to experience. For example, the first threshold may be 0.1, and the second threshold may be $THR_2$. $THR_2=ave_1-\gamma \times std_1$, $\gamma$ is any value selected from a range from 1 to 3, $ave_1$ represents the average value of the first parameters of the respective targets in the category (e.g., category k) to which the target A belongs, and $std_1$ represents the variance of the first parameters for the respective targets in the category (e.g., category k) to which the target A belongs.

The second detecting sub-circuit is configured to, when the first detecting sub-circuit detects that the first parameter of the target A is greater than the larger one of the first and second thresholds, detect whether the target A is the target in the category to which the target A belongs to be firstly processed in the dataset. The third detecting sub-circuit is configured to, when the second detecting sub-circuit detects that the target A is not the target in the category to which the target A belongs to be firstly processed in the dataset, detect whether a difference between the first parameter of the detection frame corresponding to the target A and the first parameter of a detection frame corresponding to a previous processed target in the category to which the target A belongs is greater than a third threshold. The third threshold $THR_3$ may be obtained according to experience, for example, the first threshold $THR_3$ may be 0.3.

Figure 5:
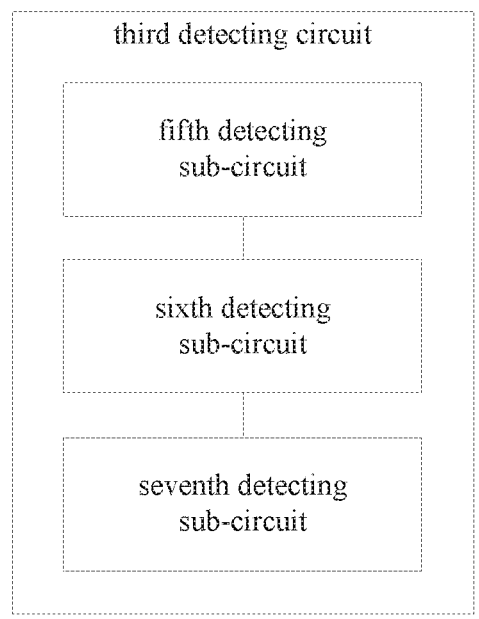
FIG. 5 is a diagram of a second detecting circuit in an image processing device for multi-object detection according to an embodiment of the present disclosure.

FIG. 5 is a diagram of a second detecting circuit in an image processing device for multi-object detection according to an embodiment of the present disclosure. As shown in FIG. 5, in some embodiments, the third detecting circuit includes a fifth detecting sub-circuit, a sixth detecting sub-circuit, and a seventh detecting sub-circuit.

The fifth detecting sub-circuit is configured to detect whether the targets A and B belong to a same category.

The sixth detecting sub-circuit is configured to, when the fifth detecting sub-circuit detects that the targets A and B belong to the same category, determine whether the target B should be removed from the dataset according to a comparison result of the confidence score first parameter of the target A to a first preset category threshold of the category to which the targets A and B belong, a comparison result of the confidence scorefirst parameter of the target B to the first preset category threshold, a ratio of an overlapping area between the detection frames corresponding to the targets A and B to an area of the detection frame corresponding to the target A, and a ratio of the overlapping area to an area of the detection frame corresponding to the target B. The ratio of the overlapping area to the area of the detection frame corresponding to the target A and the ratio of the overlapping area to the area of the detection frame corresponding to the target B are recorded as a first radio and a second ratio, respectively.

Specifically, the sixth detecting sub-circuit is configured to detect whether the first parameters of the targets A and B are both greater than the first preset category threshold of the category to which the targets A and B both belong. $THR_4 = ave_1 + 2 \times std_1$, $THR_4$ represents the first preset category threshold of the category to which the targets A and B belong, $ave_1$ represents the average value of the first parameters of the respective targets in the category to which the target A belongs, and $std_1$ represents the variance of the first parameters for the respective targets in the category to which the target A belongs. If the first parameters of the targets A and B are both greater than the first preset category threshold, the target B is not removed from the dataset. If the first parameter of the target B is less than the first preset category threshold, the first and second ratios are calculated, and it is detected whether the greater one of the first and second ratios is greater than a first preset ratio. If so, the target B is removed from the dataset, otherwise, the target B is not removed from the dataset.

The seventh detecting sub-circuit is configured to, when the fifth detecting sub-circuit determines that the targets A and B do not belong to the same category, determine whether the target B should be removed from the dataset according to a comparison result of the first parameter of the detection frame corresponding to the target A to a first preset category threshold of the category to which the target A belongs, a comparison result of the first parameter of the detection frame corresponding to the target B to a first preset category threshold of the category to which the target B belongs, the first ratio and the second ratio, and a comparison result of the first parameter of the detection frame corresponding to the target B to a second preset category threshold.

Specifically, the seventh detecting sub-circuit is configured to detect whether the first parameter of the detection frame corresponding to the target A is greater than the first preset category threshold of the category to which the target A belongs, and the first parameter of the detection frame corresponding to the target B is greater than the first preset category threshold of the category to which the target B belongs. If the first parameter of the detection frame corresponding to the target A is greater than the first preset category threshold of the category to which the target A belongs, and the first parameter of the detection frame corresponding to the target B is greater than the first preset category threshold of the category to which the target B belongs, the target B is not removed from the dataset. If the first parameter of the detection frame corresponding to the target B is less than the first preset category threshold of the category to which the target B belongs, the first ratio and the second ratio are calculated, and it is detected whether the first ratio and the second ratio are both greater than a second preset ratio. If the first and second ratios are both greater than the second preset ratio, the target B is removed from the dataset. If at least one of the first and second ratios is less than or equal to the second preset ratio, it is detected whether the first ratio is greater than a third preset ratio, and it is detected whether the first parameter of the detection frame corresponding to the target B is less than a second preset category threshold $THR_5 = ave_2 - \gamma \times std_2$. $THR_5$ represents the second preset category threshold of the category to which the target B belongs, $\gamma$ is any value selected from a range from 1 to 3, $ave_2$ represents the average value of the first parameters of the respective detection frames corresponding respectively to the respective targets in the category to which the target B belongs, and $std_2$ represents the variance of the first parameters of the respective detection frame corresponding respectively to the respective targets in the category to which the target B belongs. If the first ratio is greater than the third preset ratio and it is detected that the first parameter of the detection frame corresponding to the target B is less than the second preset category threshold, the target B is removed from the dataset. If the first ratio is less than or equal to the third preset ratio, and it is detected that the first ratio is greater than a fourth preset ratio, the target B is removed from the dataset; otherwise, the target B is not removed from the dataset.

The image processing device for multi-object detection of the present disclosure includes the above functional sub-circuits, and may adopt the method described herein to respectively remove the targets that belong to the same or different categories according to the first parameters and the overlapping area between the detected targets, and the improved image processing method effectively improves the accuracy of the algorithms for dense multi-object detection.

Figure 6:
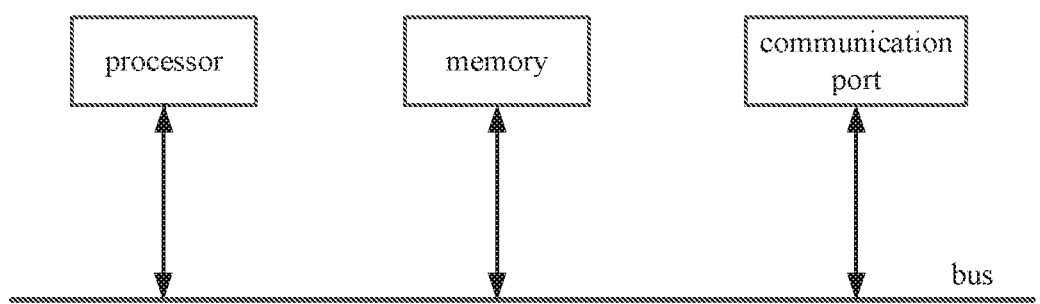
FIG. 6 is a diagram of an image processing device for multi-object detection according to an embodiment of the present disclosure.

The present disclosure also provides an image processing apparatus for multi-object detection. The non-maximum suppression method for multi-object detection and/or the image processing method described herein may be implemented by an ultra-high-resolution image reconstruction apparatus. FIG. 6 is a diagram of an image processing apparatus for multi-object detection according to an embodiment of the present disclosure. As shown in FIG. 6, the apparatus may include a processor and a memory storing computer instructions. In some embodiments, the processor may include a central processing unit (CPU), an application specific integrated circuit (ASIC), a field programmable gate array (FPGA), an image processor GPU, or one or more integrated circuits that may be configured to implement the methods described herein.

The memory may include a mass storage for data or instructions. For example, but not limitation, the memory may include a hard disk drive (HDD), a floppy disk drive, a flash memory, an optical disk, a magneto-optical disk, a magnetic tape or a universal serial bus (USB) drive, or a combination thereof. The memory may include a removable or non-removable (or fixed) medium if appropriate. The memory may be inside or outside the data processing device if appropriate. In some embodiments, the memory is a non-volatile solid-state memory. In some embodiments, the memory includes a read-only memory (ROM). The ROM may be a mask-programmed ROM, a programmable ROM (PROM), an erasable PROM (EPROM), an electrically erasable PROM (EEPROM), an electrically rewritable ROM (EAROM), a flash memory, or a combination thereof if appropriate.

The processor may implement one or more steps of the non-maximum suppression method for multi-object detection described herein by reading and executing computer program instructions stored in the memory.

In some embodiments, the apparatus shown in FIG. 6 may further include a communication interface and a bus. As shown in FIG. 6, the processor, the memory, and the communication interface are connected and communicated with each other through the bus.

The communication interface is mainly used to implement communication between various sub-circuits, devices, circuits, and/or apparatuses described herein.

The bus includes hardware, software, or both, and couples various components of the apparatus to each other. For example but not limitation, the bus may include an accelerated graphics port (AGP) or other graphics bus, an enhanced industry standard architecture (EISA) bus, a front side bus (FSB), a super transfer (HT) interconnect, an industry standard architecture (ISA) Bus, unlimited bandwidth interconnect, a low pin count (LPC) bus, a memory bus, a micro-channel architecture (MCA) bus, a peripheral component interconnect (PCI) bus, a PCI-Express (PCI-X) bus, a serial advanced technology accessory (SATA) bus, a Video Electronics Standards Association local (VLB) bus, or other suitable bus, or a combination thereof. The bus may include one or more buses if appropriate. Although embodiments of the present disclosure describe and illustrate a particular bus, the present disclosure contemplates any suitable bus or interconnect.

The present disclosure also provides a computer-readable storage medium. Computer instructions are stored on the computer-readable storage medium, and the computer instructions, when executed by a processor, may cause the processor to implement one or more steps of the non-maximum suppression method and/or the image processing method for multi-object detection described herein.

It is to be noted that the present disclosure is not limited to the specific configurations and processes described above and illustrated in the figures. For brevity, detailed descriptions of known methods are omitted here. In the above embodiments, several specific steps have been described and shown as examples. However, the method of the present disclosure is not limited to the specific steps described and shown, and those skilled in the art can make various changes, modifications, and additions, or change the order between the steps after understanding the spirit of the present disclosure.

The functional blocks shown in the structural block diagram described above may be implemented as hardware, software, firmware, or a combination thereof. When implemented in hardware, it may be, for example, an electronic circuit, an application specific integrated circuit (ASIC), appropriate firmware, plug-ins, function cards, and the like. When implemented in software, elements of the present disclosure are programs or code segments that are used to perform the required tasks. The programs or code segments can be stored in a machine-readable medium, or transmitted on a transmission medium or a communication link through a data signal carried on a carrier. The term "machine-readable medium" may include any medium capable of storing or transmitting information. Examples of the machine-readable medium include an electronic circuit, a semiconductor memory device, ROM, a flash memory, an erasable ROM (EROM), a floppy disk, CD-ROM, an optical disk, a hard disk, a fiber optic medium, a radio frequency (RF) link, and the like. The code segments can be downloaded via a computer network such as Internet, a local area network, or the like.

It should also be noted that the exemplary embodiments in the present disclosure describe some methods or systems based on a series of steps or devices. However, the present disclosure is not limited to the order of the above-mentioned steps, that is, the steps may be executed in the order mentioned herein, or may be different from the order described herein, or several steps may be executed simultaneously.

The foregoing is only a specific implementation of the present disclosure, and those skilled in the art can clearly understand that for the convenience and brevity of the description, the specific operation processes of the systems, sub-circuits, and circuits described above may refer to the corresponding processes of the foregoing method embodiments, and is not described in detail here. It should be understood that the scope of the present disclosure is not limited thereto, and those skilled in the art can easily think of various equivalent modifications or replacements within the scope of the present disclosure, and these modifications or replacements should be covered within the scope of the present disclosure.

It can be understood that the above implementations are merely exemplary implementations adopted to explain the principles of the present disclosure, but the present disclosure is not limited thereto. For those of ordinary skill in the art, various variations and improvements can be made without departing from the spirit and essence of the present disclosure, and these variations and improvements are also considered as the scope of the present disclosure.

What is claimed is:

1. An image processing method for multi-object detection, comprising:
   obtaining an image including a plurality of targets and detecting the plurality of targets included in the image;
   obtaining categories of the plurality of detected targets and first parameters of respective detection frames corresponding to the respective plurality of detected targets respectively, and ranking the plurality of detected targets according to the first parameters in a descending order to obtain a dataset;
   obtaining a target with a highest first parameter in the dataset as a first detected target, and detecting whether a first parameter of a first detection frame corresponding to the first detected target satisfies a preset category condition of a category to which the first detected target belongs;

when the first parameter of the first detection frame corresponding to the first detected target satisfies the preset category condition of the category to which the first detected target belongs, detecting whether the first detection frame corresponding to the first detected target overlaps with a detection frame corresponding to another target among the plurality of detected targets except the first detected target;

when the first detection frame overlaps with the detection frame corresponding to the other target, recording the other target as a second detected target, comparing whether the category of the first detected target is the same as that of the second detected target, and selecting a corresponding method according to a result of comparing the category of the first detected target with that of the second detected target, to determine whether to remove the second detected target from the dataset; and when the second detected target is determined to be removed from the dataset, removing the second detected target from the dataset to obtain a current dataset, and performing a step of obtaining the target with the highest first parameter in the dataset as the first detected target wherein the current dataset is used as the dataset, to traverse all detected targets in the dataset; and, when the second detected target is determined not to be removed from the dataset, obtaining a current dataset with not removing the first detected target and the second detected target from the dataset, and performing the step of obtaining the target with the highest first parameter in the dataset as the first detected target wherein a dataset composed of all detected targets in the current dataset except the second detected target is used as the dataset, to traverse all detected targets in the dataset.

2. The image processing method of claim 1, wherein the step of detecting whether the first parameter of the first detection frame corresponding to the first detected target satisfies the preset category condition of the category to which the first detected target belongs comprises:

detecting whether the first parameter of the first detection frame corresponding to the first detected target is greater than a larger one of first and second thresholds, wherein $THR_2=ave_1-\gamma \times std_1$, $THR_2$ represents the second threshold, $\gamma$ is a value selected from a range from 1 to 3, $ave_1$ represents an average value of first parameters of respective detection frames corresponding respectively to respective detected targets in the category to which the first detected target belongs, and $std_1$ represents a variance of the first parameters of the respective detection frames corresponding respectively to the respective detected targets in the category to which the first detected target belongs;

when the first parameter of the first detection frame corresponding to the first detected target is greater than the larger one of the first and second thresholds, detecting whether the first detected target is a detected target in the category to which the first detected target belongs to be firstly processed in the dataset; and when the first detected target is not the detected target in the category to which the first detected target belongs to be firstly processed in the dataset, detecting whether a difference between the first parameter of the first detection frame corresponding to the first detected target and a first parameter of a detection frame corresponding to a previous processed detected target in the category to which the first detected target belongs is less than a third threshold, and when the difference is less than the third threshold, performing a step of detecting whether the first detection frame corresponding to the first detected target overlaps with a detection frame corresponding to another target among of the plurality of detected targets except the first detected target.

3. The image processing method of claim 2, wherein the step of when the first detection frame overlaps with the detection frame corresponding to the other target, recording the other target as the second detected target, comparing whether the category of the first detected target is the same as that of the second detected target, and selecting the corresponding method according to the result of comparing the category of the first detected target with that of the second detected target, to determine whether to remove the second detected target from the dataset comprises:

comparing whether the category of the first detected target is the same as that of the second detected target; and when the category of the first detected target is the same as that of the second detected target, determining whether to remove the second detected target from the dataset, according to a comparison result of the first parameter of the first detection frame corresponding to the first detected target to a first preset category threshold of the category to which the first and second detected targets belong, a comparison result of the first parameter of a second detection frame corresponding to the second detected target to the first preset category threshold, a ratios of an overlapping area between the first detection frame and a second detection frame corresponding to the second detected target, to an area of the first detection frame and an area of the second detection frame respectively; wherein the respective ratios of the overlapping area between the first and second detection frames to the respective areas of the first and second detection frames are recorded as a first ratio and a second ratio respectively.

4. The image processing method of claim 2, wherein the step of when the first detection frame overlaps with the detection frame corresponding to the other target, recording the other target as the second detected target, comparing whether the category of the first detected target is the same as that of the second detected target, and selecting the corresponding method according to the result of comparing the category of the first detected target with that of the second detected target, to determine whether to remove the second detected target from the dataset comprises:

comparing whether the category of the first detected target is the same as that of the second detected target; and when the category of the first detected target is different from that of the second detected target, determining whether to remove the second detected target from the dataset according to a comparison result of the first parameter of the first detection frame corresponding to the first detected target to a first preset category threshold of the category to which the first detected target belongs, a comparison result of the first parameter of a second detection frame corresponding to the second detected target to a first preset category threshold of the category to which the second detected target belongs, a ratio of an overlapping area between the first detection frame and a second detection frame corresponding to the second detected target, to an area of the first detection frame, a ratio of the overlapping area between the first and second detection frames to an area of the second detection frame, and a comparison result of the first parameter of the second detection frame corresponding to the second detected target to a second preset category threshold, wherein the respective ratios of the overlapping area between the first and second detection frames to the respective areas of the first and second detection frames are recorded as a first ratio and a second ratio respectively.

5. The image processing method of claim 3, wherein the step of when the category of the first detected target is the same as that of the second detected target, determining whether to remove the second detected target from the dataset, according to a comparison result of the first parameter of the first detection frame corresponding to the first detected target to a first preset category threshold of the category to which the first and second detected targets belong, a comparison result of the first parameter of a second detection frame corresponding to the second detected target to the first preset category threshold, a ratios of an overlapping area between the first detection frame and a second detection frame corresponding to the second detected target, to an area of the first detection frame and an area of the second detection frame respectively comprises:
  detecting whether the first parameters of the respective detection frames corresponding respectively to the first and second detected targets are both greater than the first preset category threshold of the category to which the first and second detected targets belong, wherein $THR_4=ave_1+2\times std_1$, $THR_4$ represents the first preset category threshold of the category to which the first and second detected targets belong, $ave_1$ represents the average value of the first parameters of the respective detection frames corresponding respectively to the respective detected targets in the category to which the first detected target belongs, and $std_1$ represents the variance of the first parameters of the respective detection frames corresponding respectively to the respective detected targets in the category to which the first detected target belongs; and
  when the first parameters of the respective detection frames corresponding respectively to the first and second detected targets are both greater than the first preset category threshold, not removing the second detected target from the dataset;
  when the first parameter of the second detection frame corresponding to the second detected target is less than the first preset category threshold, calculating the first ratio and the second ratio, and detecting whether a greater ratio of the first ratio and the second ratio is greater than a first preset ratio, and removing the second detected target from the dataset in a case that the greater ratio of the first ratio and the second ratio is greater than the first preset ratio; otherwise, not removing the second detected target from the dataset.

6. The image processing method of claim 4, wherein the step of when the category of the first detected target is different from that of the second detected target, determining whether to remove the second detected target from the dataset according to a comparison result of the first parameter of the first detection frame corresponding to the first detected target to a first preset category threshold of the category to which the first detected target belongs, a comparison result of the first parameter of a second detection frame corresponding to the second detected target to a first preset category threshold of the category to which the second detected target belongs, a ratio of an overlapping area between the first detection frame and a second detection frame corresponding to the second detected target, to an area of the first detection frame, a ratio of the overlapping area between the first and second detection frames to an area of the second detection frame, and a comparison result of the first parameter of the second detection frame corresponding to the second detected target to a second preset category threshold comprises:
  detecting whether the first parameter of the first detection frame corresponding to the first detected target is greater than the first preset category threshold of the category to which the first detected target belongs and the first parameter of the second detection frame corresponding to the second detected target is greater than the first preset category threshold of the category to which the second detected target belongs;
  when the first parameter of the first detection frame corresponding to the first detected target is greater than the first preset category threshold of the category to which the first detected target belongs and the first parameter of the second detection frame corresponding to the second detected target is greater than the first preset category threshold of the category to which the second detected target belongs, not removing the second detected target from the dataset;
  when the first parameter of the detection frame corresponding to the second detected target is less than the first preset category threshold of the category to which the second detected target belongs, obtaining the first ratio and the second ratio, and detecting whether each of the first ratio and the second ratio is greater than a second preset ratio;
  when each of the first ratio and the second ratio is greater than the second preset ratio, removing the second detected target from the dataset;
  when at least one of the first ratio and the second ratio is less than or equal to the second preset ratio, detecting whether the first ratio is greater than a third preset ratio, and detecting whether the first parameter of the second detection frame corresponding to the second detected target is less than the second preset category threshold, wherein $THR_5=ave_2-\gamma\times std_2$, $THR_5$ represents the second preset category threshold of the category to which the second detected target belongs, $\gamma$ is the value selected from a range from 1 to 3, $ave_2$ represents an average value of first parameters of respective detection frames corresponding respectively to respective detected targets in the category to which the second detected target belongs, and $std_2$ represents a variance of the first parameters of the respective detection frames corresponding respectively to the respective detected targets in the category to which the second detected target belongs;
  if the first ratio is greater than the third preset ratio and it is detected that the first parameter of the second detection frame corresponding to the second detected target is less than the second preset category threshold, removing the second detected target from the dataset;
  if the first ratio is less than or equal to the third preset ratio and it is detected that the first parameter of the second detection frame corresponding to the second detected target is greater than or equal to the second preset category threshold, not removing the second detected target from the dataset; and
  if the first ratio is less than or equal to the third preset ratio and it is detected that the first ratio is greater than a fourth preset ratio, removing the second detected target from the dataset; otherwise, not removing the second detected target from the dataset.

7. The image processing method of claim 1, when the first parameter of the first detection frame corresponding to the first detected target does not satisfy the preset category condition of the category to which the first detected target belongs, removing the first detected target from the dataset.

8. An image processing device for multi-object detection, comprising:
an obtaining circuit configured to obtain an image including a plurality of targets and detecting the plurality of targets included in the image, obtain categories of the plurality of detected targets and first parameters of respective detection frames corresponding to the respective plurality of detected targets respectively, and rank the plurality of detected targets according to the first parameters in a descending order to obtain a dataset;
a first detecting circuit configured to obtain a target with a highest first parameter in the dataset as a first detected target, and detect whether a first parameter of a first detection frame corresponding to the first detected target satisfies a preset category condition of a category to which the first detected target belongs;
a second detecting circuit configured to detect whether the first detection frame corresponding to the first detected target overlaps with a detection frame corresponding to another target among the plurality of detected targets except the first detected target, when the first detecting circuit detects that the first parameter of the first detection frame corresponding to the first detected target satisfies the preset category condition of the category to which the first detected target belongs;
a third detecting circuit configured to record the other target as a second detected target, when the first detection frame overlaps with the detection frame corresponding to the other target, compare whether the category of the first detected target is a same as that of the second detected target, and select a corresponding method according to a result of comparing the category of the first detected target with that of the second detected target, to determine whether to remove the second detected target from the dataset;
a removing circuit configured to remove the second detected target from the dataset, when the third detecting circuit determines that the second detected target is to be removed from the dataset; and
a traversing circuit configured to traverse each target in the dataset by using a preset method.

9. The image processing device of claim 8, wherein the first detecting circuit comprises:
a first detecting sub-circuit configured to detect whether the first parameter of the first detection frame corresponding to the first detected target is greater than a larger one of first and second thresholds, wherein $THR_2 = ave_1 - \gamma \times std_1$, $THR_2$ represents the second threshold, $\gamma$ is a value selected from a range from 1 to 3, $ave_1$ represents an average value of first parameters of respective detection frames corresponding respectively to respective detected targets in the category to which the first detected target belongs, and $std_1$ represents a variance of the first parameters of the respective detection frames corresponding respectively to the respective detected targets in the category to which the first detected target belongs;
a second detecting sub-circuit configured to detect whether the first detected target is a detected target in the category to which the first detected target belongs to be firstly processed in the dataset when the first detecting sub-circuit detects that the first parameter of the first detection frame corresponding to the first detected target is greater than the larger one of the first and second thresholds; and
a third detecting sub-circuit configured to, when the second detecting sub-circuit detects that the first detected target is not the detected target in the category to which the first detected target belongs to be firstly processed in the dataset, detect whether a difference between the first parameter of the first detection frame corresponding to the first detected target and a first parameter of a detection frame corresponding to a previous processed detected target in the category to which the first detected target belongs is less than a third threshold.

10. The image processing device of claim 9, wherein the third detecting circuit comprises:
a fifth detecting sub-circuit configured to detect whether the category of the first detected target is the same as that of the second detected target; and
a sixth detecting sub-circuit configured to, when the fifth detecting sub-circuit detects that the category of the first detected target is the same as that of the second detected target, determine whether to remove the second detected target from the dataset, according to a comparison result of the first parameter of the first detection frame corresponding to the first detected target to a first preset category threshold of the category to which the first and second detected targets belong, a comparison result of the first parameter of a second detection frame corresponding to the second detected target to the first preset category threshold, a ratios of an overlapping area between the first detection frame and a second detection frame corresponding to the second detected target, to an area of the first detection frame and an area of the second detection frame respectively; wherein the respective ratios of the overlapping area between the first and second detection frames to the respective areas of the first and second detection frames are recorded as a first ratio and a second ratio respectively; and
a seventh detecting sub-circuit configured to, when the fifth detecting sub-circuit detects that the category of the first detected target is different from that of the second detected target, determine whether to remove the second detected target from the dataset according to a comparison result of the first parameter of the first detection frame corresponding to the first detected target to a first preset category threshold of the category to which the first and second detected targets belong, a comparison result of the first parameter of the second detection frame corresponding to the second detected target to the first preset category threshold, the first ratio and the second ratio, and a comparison result of the first parameter of the second detection frame corresponding to the second detected target to a second preset category threshold.

11. The image processing device of claim 10, wherein the sixth detecting sub-circuit is further configured to detect whether the first parameters of the respective detection frames corresponding respectively to the first and second detected targets are both greater than the first preset category threshold of the category to which the first and second detected targets belong, wherein $THR_4 = ave_1 + 2 \times std_1$, $THR_4$ represents the first preset category threshold of the category to which the first and second detected targets belong, $ave_1$ represents the average value of the first parameters of the respective detection frames corresponding respectively to the respective detected targets in the category to which the first detected target belongs, and $std_1$ represents the variance of the first parameters of the respective detection frames corresponding respectively to the respective detected targets in the category to which the first detected target belongs;

when the first parameters of the respective detection frames corresponding respectively to the first and second detected targets are both greater than the first preset category threshold, not remove the second detected target from the dataset; and when the first parameter of the second detection frame corresponding to the second detected target is less than the first preset category threshold, calculating the first ratio and the second ratio, and detecting whether a greater ratio of the first ratio and the second ratio is greater than a first preset ratio, and remove the second detected target from the dataset in a case that the greater ratio of the first ratio and the second ratio is greater than the first preset ratio; otherwise, not remove the second detected target from the dataset.

12. The image processing device of claim 10, wherein the seventh detecting sub-circuit is further configured to detect whether the first parameter of the first detection frame corresponding to the first detected target is greater than the first preset category threshold of the category to which the first detected target belongs and the first parameter of a detection frame corresponding to the second detected target is greater than the first preset category threshold of the category to which the second detected target belongs;

when the first parameter of the first detection frame corresponding to the first detected target is greater than the first preset category threshold of the category to which the first detected target belongs and the first parameter of the second detection frame corresponding to the second detected target is greater than the first preset category threshold of the category to which the second detected target belongs, not remove the second detected target from the dataset;

when the first parameter of the second detection frame corresponding to the second detected target is less than the first preset category threshold of the category to which the second detected target belongs, obtain the first ratio and the second ratio, and detect whether each of the first ratio and the second ratio is greater than a second preset ratio;

when each of the first ratio and the second ratio is greater than the second preset ratio, remove the second detected target from the dataset;

when at least one of the first ratio and the second ratio is less than or equal to the second preset ratio, detect whether the first ratio is greater than a third preset ratio, and detecting whether the first parameter of the second detection frame corresponding to the second detected target is less than the second preset category threshold, wherein $THR_5 = ave_2 - \gamma \times std_2$, $THR_5$ represents the second preset category threshold of the category to which the second detected target belongs, $\gamma$ is the value selected from a range from 1 to 3, $ave_2$ represents an average value of first parameters of respective detection frames corresponding respectively to respective detected targets in the category to which the second detected target belongs, and $std_2$ represents a variance of the first parameters of the respective detection frames corresponding respectively to the respective detected targets in the category to which the second detected target belongs;

if the first ratio is greater than the third preset ratio and it is detected that the first parameter of the second detection frame corresponding to the second detected target is less than the second preset category threshold, remove the second detected target from the dataset; and if the first ratio is less than or equal to the third preset ratio and it is detected that the first ratio is greater than a fourth preset ratio, remove the second detected target from the dataset; otherwise, not remove the second detected target from the dataset.

13. An image processing apparatus for multi-object detection, comprising: a memory, one or more processors, and computer instructions stored in the memory, the one or more processors being configured, when executing the computer instructions, to implement the method of claim 1.

14. A non-transitory computer-readable storage medium having computer instructions stored thereon that, when executed by a processor, cause the processor to implement the method of claim 1.

* * * * *